United States Patent [19]
Williams et al.

[11] Patent Number: 5,151,285
[45] Date of Patent: Sep. 29, 1992

[54] COMESTIBLE PROCESSING SYSTEM AND METHOD

[75] Inventors: Rick L. Williams; Merton R. Leggott, both of Lincoln, Nebr.; Richard G. Bailey, Overland Park, Kans.

[73] Assignee: Flakee Mills, Inc., Lincoln, Nebr.

[21] Appl. No.: 695,648

[22] Filed: May 6, 1991

[51] Int. Cl.$^5$ .......................... A23L 1/00; H05B 6/00
[52] U.S. Cl. ...................... 426/241; 99/451; 99/470; 99/536; 99/DIG. 14; 426/242; 426/460; 426/464; 426/634
[58] Field of Search ............... 426/241, 242, 507, 518, 426/460, 464, 622, 634; 99/451, 358, 536, 470, DIG. 14; 219/388

[56] References Cited

U.S. PATENT DOCUMENTS

| | | | |
|---|---|---|---|
| 3,343,961 | 9/1967 | Truax | 426/242 |
| 4,555,409 | 11/1985 | Hart | 426/242 |
| 5,023,429 | 6/1991 | Bailey et al. | 219/388 |

Primary Examiner—George Yeung
Attorney, Agent, or Firm—Litman, McMahon & Brown

[57] ABSTRACT

A comestible processing system includes equipment of components for receiving, soaking, draining and tempering food or feed material. Furthermore, infrared material processors are provided for energizing the material with energy in the infrared range. The retention vessel is provided for receiving the heated, energized material for retaining the same in a temperature-elevated condition. A cooler receives the heated material, cools it and flashes off steam therefrom. A processing method includes the steps performed on the material by the above components, and includes additional, optional steps of flaking, grinding and mixing/formulating the material in preparation for packaging same.

23 Claims, 2 Drawing Sheets

COMESTIBLE PROCESSING SYSTEM AND METHOD

CROSS REFERENCE TO RELATED APPLICATION

The present application is a continuation-in-part of U.S. patent application Ser. No. 420,030, filed Oct. 11, 1989 for U.S. Pat. No. 5,023,429.

BACKGROUND OF THE INVENTION

1. Field of the Invention

The present invention relates generally to comestible processing, and in particular to a system and method of processing comestible materials such as beans, lentils and legumes into quick-cooking and instant products.

2. Description of the Related Art

Leguminous food materials, such as beans, peas and lentils, are an important food source. Many of these materials are consumed whole, but require substantial preparation time for cooking, soaking, etc. Legumes are commonly cooked under pressure, as disclosed in the Sterner et al. U.S. Pat. No. 4,735,816 for Dehydrated Refried Bean Product and Methods of Manufacture.

Comestible leguminous products are also commonly processed into flakes, flour, mixes, etc. However, typical problems with previous systems and methods for processing leguminous comestibles include relatively high levels of energy consumption, controlling microbiological activity (e.g., bacteria, spores, mold, fungus, etc.) which can limit shelf life, and preserving taste, mouth feel, and flavor.

Heretofore, there has not been available a system or method for processing leguminous comestibles with the advantages nd features of the present invention, which addresses the aforementioned considerations.

SUMMARY OF THE INVENTION

In the practice of the practice of the present invention, a comestible processing system is provided which includes equipment of components for receiving, soaking, draining and tempering food or feed materials. A material processor is provided for energizing the material with energy in the infrared range for heating same. The heated, energized material is then received in a retention vessel wherein the heat is retained and further cooking of the product can occur by the action of the latent heat therein. One or more material processors and retention vessels can be employed in the system. The cooked material is cooled in a cooler for packaging and can optionally be flaked, ground and/or mixed/formulated. In the practice of the method of the present invention, the material is processed in steps or stages corresponding to and performed by the equipment and components noted above. Various optional configurations of the system and method are possible, including the use of multiple processors and retention vessels, and the elimination and/or combining of certain equipment, components, steps and stages.

OBJECTS AND ADVANTAGES OF THE INVENTION

The principal objects and advantages of the present invention include: providing a comestible processing system and method; providing such a system and method which are particularly adapted for processing legumes; providing such a system and method which are relatively energy-efficient; providing such a system and method which effectively control microbiological activities; providing such a system and method which provide a variety of finished products; and providing such a system and method which are efficient in operation, economical to construct, and particularly well adapted for the proposed usages thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
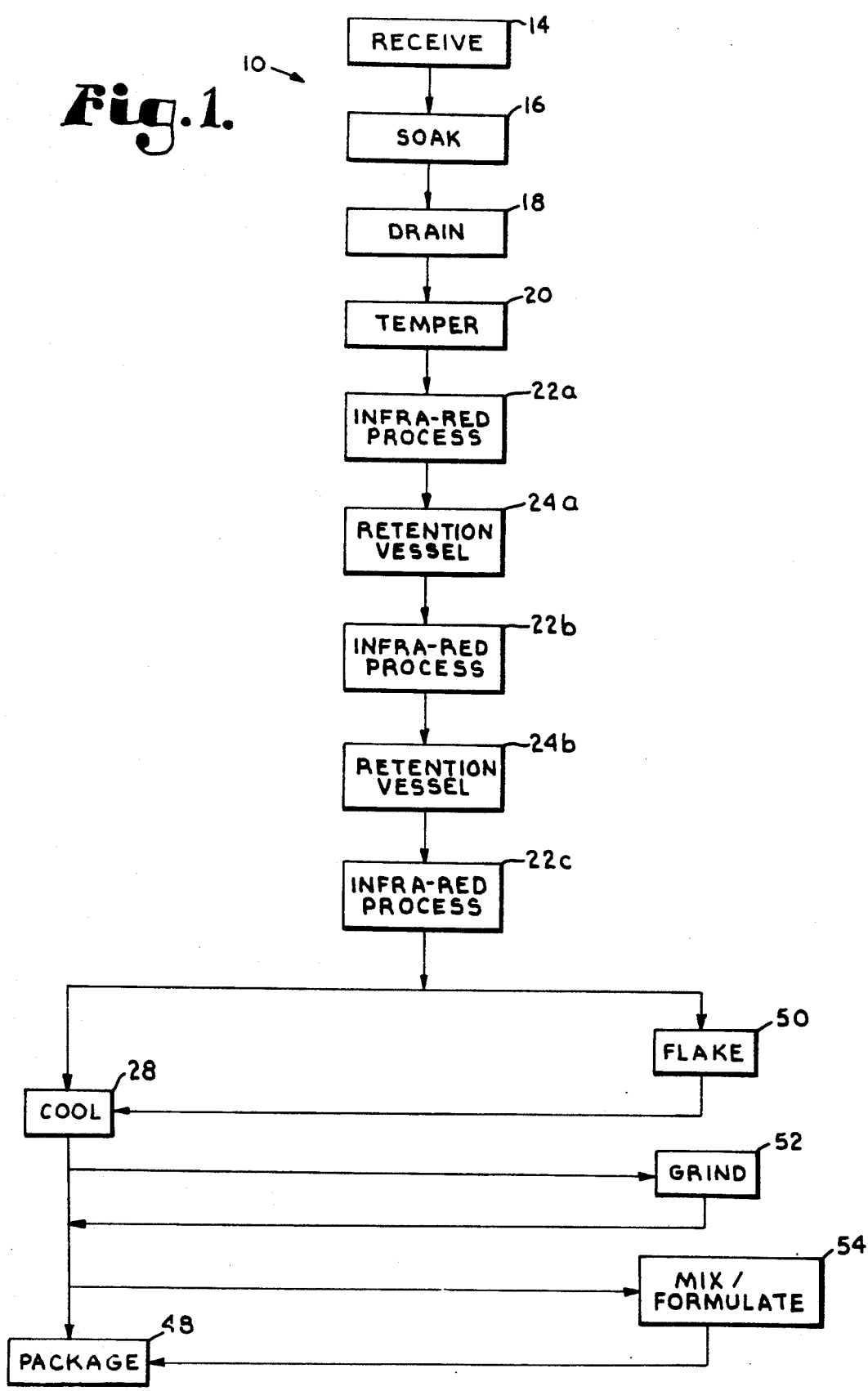
FIG. 1 is a schematic, flow chart diagram of a comestible processing system and method embodying the present invention.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Comestible Processing System and Method

Referring to the drawings in more detail, reference numeral 10 generally designates a system for processing food materials into comestible food products. Without limitation on the wide range of comestible materials that can be processed with the system and method of the present invention, exemplary food materials include legumes such as beans, peas and lentils. Among the various types of beans that can be processed with the present invention are pinto, great northern, navy, red, black, pink, garbanzo, lima and kidney beans.

The material is received in receiving means 14 such as a bin or hopper. Preferably the material is cleaned and/or prewashed prior to entering the system 10.

The material is soaked, for example, by immersing in water, in appropriate water vessel or soaking means 16. The soaking time can vary depending upon the type of material being processed and the desired end product. However, soaking times in the range of approximately one hour to eight hours at ambient temperatures would be appropriate for many types of materials and end products. The water can be heated for soaking the material, for example, to a temperature in the range at or below 130° F., for greater hydration of the material which will thereby attain a greater moisture content percentage.

The material is drained of free and flowing water by suitable draining means 18. The drained material may retain moisture which has been absorbed into it. The material moisture content will vary depending upon such factors as the type of material temperature and the duration of the soaking step, but moisture contents in the range of about 35% to about 60% would be fairly typical.

The drained material is tempered, for example at ambient temperature for a period of approximately twelve to twenty-four hours, whereby moisture is absorbed through the material and the moisture level therein approaches equilibrium. The material can be tempered in tempering means, such as a tempering Vessel 20.

The tempered material is heated by energizing or treating it with energy in the infrared range. The material energizing means can comprise, for example, a first vibratory bulk material processor 22a of the type disclosed in the Bailey et al. U.S. U.S. patent application Ser. No. 399,258, now U.S. Pat. No. 5,024,145 for Vibratory Bulk Material Processor and Method, which is co-pending and assigned to a common assignee herewith. The disclosure of said pending patent application is incorporated herein by reference.

The duration of the energize step and the temperature to which the material is raised can vary depending upon the specific characteristics of the material and the desired finished product. For example, the material can be elevated to a temperature in the approximate range Of 190° F. to 250° F. An alternative energy source means, which could be used in place of the vibratory bulk material processor 22a, is disclosed in the Bailey et al. U.S. Pat. No. 4,939,346 for Bulk Material Processor and Method, which is incorporated herein by reference and which is assigned to a common assignee herewith.

Downstream of the first processor 22a is a first retention vessel 24a wherein the material is retained after exiting the processor 22a. The retention vessel 24a has an insulated construction for retaining the heat within the material. An exemplary retention vessel 24a is disclosed in the Bailey et al. U.S. patent application Ser. No. 420,030, now U.S. Pat. No. 5,023,429, for Vessel and Method for Thermally Processing Bulk Material, which is assigned to a common assignee herewith and incorporated herein by reference.

Downstream of the first retention vessel 24a is a second vibratory bulk material processor 22b, which receives the material and reheats it, for example to a temperature in the approximate range of 190° F. to 250° F. Downstream of the second vibratory bulk material processor 22b is a second retention vessel 24b. A third processor 22c is located downstream of the second retention vessel 24b.

The numbers of processors and retention vessels in the system are virtually unlimited. The configurations and operating parameters thereof are also variable, depending upon the characteristics of the material and the finished product. For example, processors can be used which energize the material with more or less energy in lieu of greater or fewer numbers of processors. A single processor 22 can be employed, and can be configured to provide desired operating conditions.

A cooler 28 is provided downstream of the third processor 24c. The cooler 28 can be a counterflow type with a top-mounted rotary airlock 30 which admits material from the processor 22c into the cooler 28, a generally cylindrical body 32 mounting an exhaust fan 36, a top 34 and an open bottom 40. A vibratory cone discharge funnel/valve 42 is mounted below the open lower end 38 of the body 36. The discharge funnel/valve 42 includes a cone mounted therein which is connected to a pneumatic vibrator and a pneumatic height adjustment for varying the discharge flow rate. A suitable discharge funnel/valve is available from Bulk Equipment Systems Technology, Inc. of Cleveland, Ohio, and is designated a "BEST-FLOW" discharger.

The counterflow cooler 28 includes high and low level sensors 43, 45. In operation, the material tends to bridge between the funnel 42 and the cone 44 when the vibrator is not actuated. Upon actuation of the vibrator, e.g., in response to actuation of the high level sensor 43, the material bridge is broken up and material flow commences. When the level of the material in the body 32 reaches the low level sensor 45, the vibrator is deactivated whereby the material bridges and discharge flow ceases. An annular band opening or gap 46 is provided between the open bottom 40 of the body 32 and the top of the funnel/valve 42 through which air is drawn by the fan 36 for discharge.

In the cooling step, steam emitted by the material is flashed off concurrently with lowering the temperature of the material, which should preferably be cooled to a suitable storage temperature. Packaging means 48 is provided downstream of the cooler 28 and can package the material in its finished product form in any suitable container or package.

The processing method of the present invention involves steps performed by the equipment and/or components of the system 10 noted above, as shown in FIG. 1.

III. Optional Processing Steps

The processing system and method described above can produce a finished whole product. However, the material can be finished with several alternative product configurations with additional equipment in the system and steps in the process.

For example, flaking means 50 can be provided downstream of the third processor 22c and upstream of the cooling means 28. Roller mills are commercially available for use as the flaking means 50. Flaking the material tends to further instantize it. The material can be flaked if a flour or meal finished product is desired.

Grinding means 52 can be located downstream of the cooler 28 for grinding the material to a finished product consisting of a flour or meal. Screening and sifting steps may be required in conjunction with grinding the material to comply with the requirements for particular product specifications.

Mixing/formulating means 54 can also be located downstream of the cooler 28 and can function to mix the product with additives such as oil, salt, spices, other flavors or food coloring to meet the requirements of particular finished product specifications.

IV. Alternative System and Method Embodiments

Figure 3:
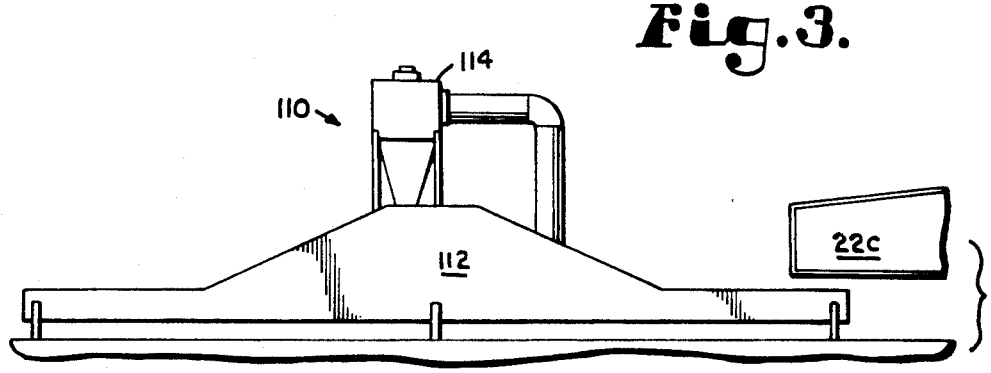
FIG. 3 is a side-elevational view of a comestible processing system comprising a first modified or alternative embodiment of the present invention with a belt-type cooler substituted for the counterflow cooler of the primary embodiment.

FIG. 3 shows a system 110 which comprises a first modified or alternative embodiment of the present invention with a belt-type cooler 112 positioned downstream of the processor 22c and mounting a cyclone 114 for flashing off steam and excess heat. The cooler 112 includes an endless woven steel belt (not shown).

A heat retention vessel with the general configuration of the cooler 28 is not shown but can be provided with suitable insulation and heating means for functioning in a manner similar to the retention vessels 24a, b.

Figure 2:
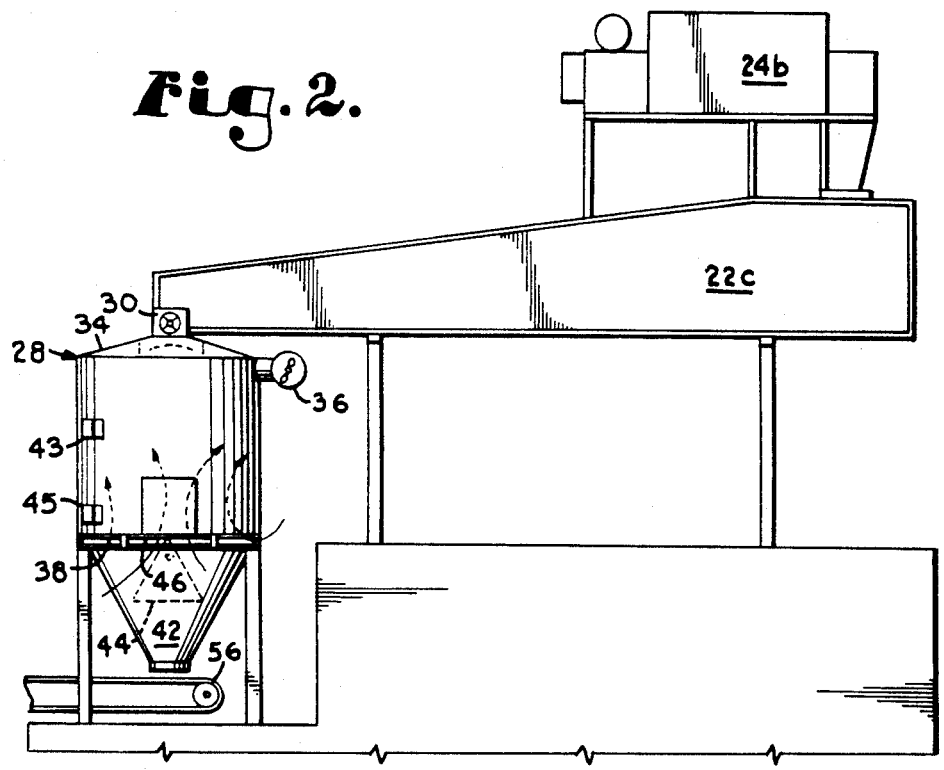
FIG. 2 is a side-elevational view of the system, particularly showing a retention vessel, a material processor and a counterflow cooler thereof.

The system 10 and the method can be configured for either continuous or batch operation. The material can be moved or conveyed through the system 10 by various suitable means, such as an endless belt conveyor 56 (FIG. 2), screw augers, etc. For batch operation, the material can be recirculated through various components or pieces of equipment in multiple passes therethrough. For example, the material could be passed through a single processor and a single retention vessel several times to achieve the same effect as if the system included multiple processors and multiple retention vessels.

It is to be understood that while certain forms of the present invention have been illustrated and described herein, it is not to be limited to the specific forms or arrangement of parts described and shown.

What is claimed and desired to be secured by Letters Patent is as follows:

1. A system for processing a food material into a comestible product, which includes:
   (a) means for receiving the food material;
   (b) means for soaking the food material;
   (c) infrared energy source means for energizing the food material with energy in the infrared range sufficient to partially cook the material;
   (d) means for retaining heat within the food material comprising a heated retention vessel to further cook the material; and
   (e) means for cooling the food material.

2. The system of claim 1, which includes:
   said heat retention means comprising a first heat retention means; and
   second heat retention means.

3. The system of claim 1, which includes:
   said energy source means comprising a first energy source means; and
   second energy source means for providing energy in the cooked infrared range for energizing the material.

4. The system of claim 1, which includes:
   flaking means for flaking said cooked material.

5. The system of claim 1, which includes:
   grinding means for grinding cooked material.

6. The system of claim 1, which includes:
   mixing and formulating means for mixing and formulating cooked material.

7. The system of claim 1 wherein said cooling means includes:
   counterflow air flow means.

8. The system of claim 7 wherein said cooling means includes:
   a body with a top including an exhaust fan and a material-inlet/air outlet opening, the body further including an open bottom; and
   a funnel/discharge valve communicating with said open bottom of said body and including a conical valve member.

9. The system of claim 8 wherein said cooling means includes:
   an annular gap between said body bottom and said funnel/discharge valve;
   a high level sensor mounted on said body;
   a low level sensor mounted on said body below said high level sensor;
   a vibrator connected to said conical valve member; and
   Actuating means for actuating said vibrator in response to signals from said level sensors.

10. The system of claim 1 wherein said cooling means comprises:
    a belt-type cooler with an endless, woven steel belt and a cyclone mounted over said belt.

11. A method of processing a food material into a comestible product, which includes the step of:
    (a) receiving said material;
    (b) soaking said material;
    (c) energizing said material with energy in the infrared range sufficient to partially cook the material;
    (d) retaining at least a portion of said energy in said by means of a heated retention vessel to further cook the material; and
    (e) cooling said material.

12. The method of claim 11 which includes the additional step of:
    grinding said cooked material.

13. The method of claim 11, which includes the additional step of:
    flaking said cooked material.

14. The method of claim 11, which includes the additional step of:
    mixing and formulating said cooked material.

15. The method of claim 11, which includes the additional step of:
    energizing said cooked material for a second time.

16. The method of claim 15, which includes the additional step of;
    retaining at least a portion of said energy received by said cooked material during the step of energizing the cooked material for a second time.

17. The method of claim 11, which includes the additional step of:
    pulling air through the cooked material generally in a direction counter to a flow direction of the material for cooling same.

18. The method of claim 17, which includes the additional steps of:
    receiving the cooked material in a counterflow-type cooler; and
    actuating the exhaust fan to cause said counterflow of air through said cooked material.

19. A method of processing a food material from the group consisting of beans, legumes and lentils into a quick-cooking or instant food product, which includes the steps of:
    (a) cleaning the material;
    (b) sorting the material;
    (c) soaking the material in water;
    (d) draining free water from the material;
    (e) tempering the material at ambient temperature for a period of approximately 12 to 24 hours;
    (f) energizing the material with infrared radiation;
    (g) raising the temperature of the material to a temperature in the range of 190° F. to 250° F.;

(h) retaining the material in a heated retention vessel for a period of approximately one-half to approximately two hours;

(i) reheating the material to a temperature in the range of approximately 190° F. to 250° F. by resubjecting it to radiation in the infrared radiation range;

(j) retaining the material in a heated retention vessel for a period of approximately fifteen minutes to approximately one hour at a temperature of approximately 175° F. to approximately 250° F.;

(k) heating the material for a third time by subjecting it to energy in the infrared radiation range;

(l) cooling the material; and (m) flashing the steam off of the material.

20. The method of claim 19, which includes the additional step of:
flaking the material.

21. The method of claim 19, which includes the additional step of:
grinding the material.

22. The method of claim 19, which includes the additional step of:
mixing and formulating the material.

23. The method of claim 19, which includes the additional step of:
packaging the material.

* * * * *